United States Patent [19]
Parsons

[11] 4,215,965
[45] Aug. 5, 1980

[54] APPARATUS AND METHOD FOR LOADING A FLOATING VESSEL WITH FLOWABLE MATERIAL

[76] Inventor: Ward H. Parsons, 1202 Green Glen Rd., Birmingham, Ala. 35216

[21] Appl. No.: 957,732

[22] Filed: Nov. 6, 1978

[51] Int. Cl.² ............................................. B63B 27/00
[52] U.S. Cl. ......................................... 414/139; 73/65; 340/617; 340/689; 414/138; 414/144; 414/786
[58] Field of Search ............... 414/137, 138, 139, 140, 414/142, 143, 144, 145, 161, 294, 295, 296, 289, 398, 786; 193/3; 212/3; 198/524, 535, 536; 114/121, 125; 73/65; 340/617, 689

[56] References Cited

U.S. PATENT DOCUMENTS

| | | | |
|---|---|---|---|
| 2,173,177 | 9/1939 | Menk | 414/139 |
| 3,114,804 | 12/1963 | Geis | 340/617 X |
| 3,269,562 | 8/1966 | Holmes et al. | 414/139 |
| 3,432,043 | 3/1969 | Ludwig | 414/139 |
| 3,548,400 | 12/1970 | Boyd et al. | 340/689 X |
| 3,612,302 | 10/1971 | DeGroot | 414/144 |
| 3,690,731 | 9/1972 | Mylting | 414/139 X |

*Primary Examiner*—L. J. Paperner
*Attorney, Agent, or Firm*—B. P. Fishburne, Jr.

[57] ABSTRACT

A water borne barge or other floating vessel is loaded automatically with flowable material from end-to-end with a proper predetermined level of material without dependency on inaccurate human observations. The automatic load-out is terminated with the vessel in a level plane. A material level sensor initiates fore and aft relative movement between the vessel and dockside material delivery equipment and the relative movement progresses until the vessel is loaded end-to-end. During the automatic load-out under control of the material level sensor, a vessel list or slope sensor monitors the degree of list in the fore and aft plane and generates an electrical signal proportional to the degree of list at any given moment. As the vessel load-out progresses, this signal will advance toward the level or null point and when such point is reached, the operation of the dockside material delivery equipment will be terminated automatically with the vessel completely loaded and in a level attitude.

10 Claims, 5 Drawing Figures

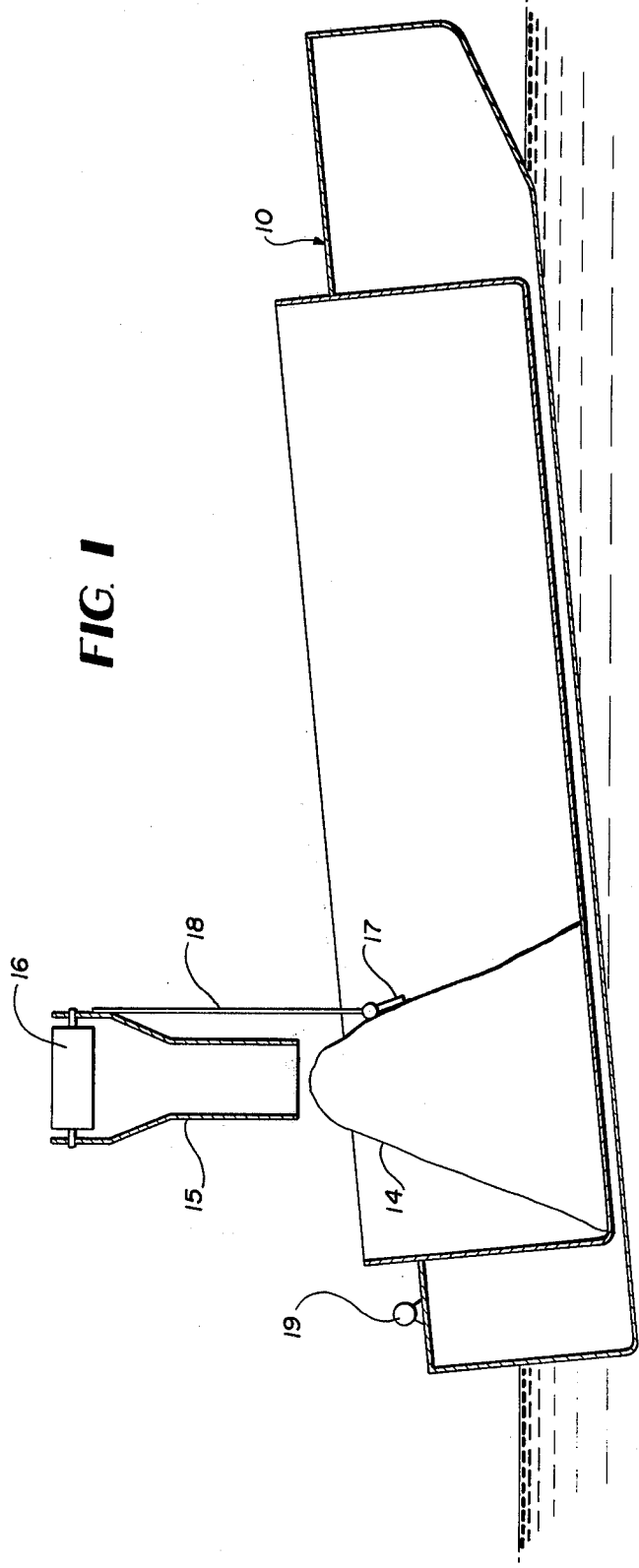
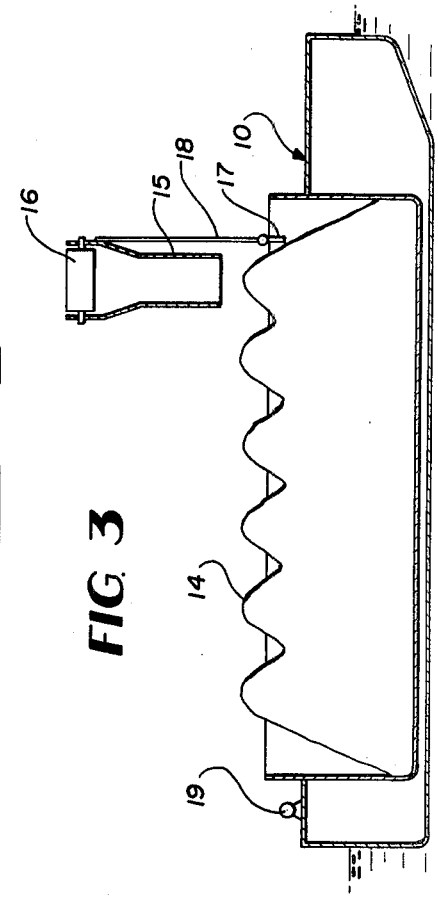
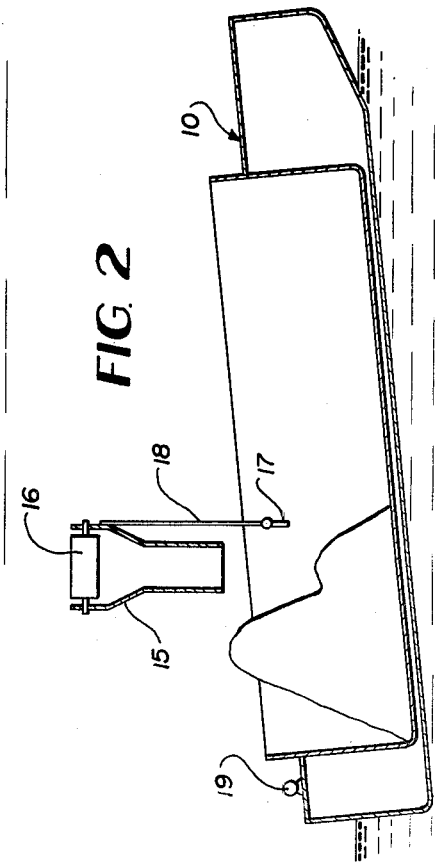

APPARATUS AND METHOD FOR LOADING A FLOATING VESSEL WITH FLOWABLE MATERIAL

CROSS-REFERENCE TO RELATED APPLICATIONS

This application contains common subject matter with prior copending application Ser. No. 933,502, filed Aug. 14, 1978, for METHOD OF AND APPARATUS FOR LOADING A FLOATING VESSEL WITH FLOWABLE SOLIDS, and application Ser. No. 950,472, filed Oct. 11, 1978, for METHOD OF AND APPARATUS FOR DRAFTING A WATER-BORNE VESSEL.

BACKGROUND OF THE INVENTION

The above-referenced patent application Ser. No. 933,502, discloses an apparatus and method for automatically loading a floating vessel with flowable solids in the port-to-starboard plane. In that application, the activity of a dockside flowable material delivery apparatus is controlled by an electrical signal generated by a pendulum-type list or slope sensor on the vessel which senses list in the port-to-starboard plane and produces an electrical signal which is proportional to the degree of list.

The present invention is directed to the automatic loading of a water-borne vessel in the fore and aft plane or from end-to-end without dependency on human observation and control. A much more accurate and satisfactory end result is achieved, wherein the vessel can be loaded to capacity end-to-end by conventional dockside material delivery equipment, and the load-out of the vessel is terminated automatically with the vessel in a substantially perfectly level condition. Such favorable result cannot ordinarily be achieved when the load-out is under control of one or more human operators because of inherent inaccuracies in depth perception and other visual observations. The automatic load-out of vessels achieved by the invention is also more economical in the long run.

Prior U.S. Pat. No. 3,612,302 is made of record herein under 37 C.F.R. 1.56. While this patent broadly discloses list responsive floating vessel loading means, the system is purely mechanical and requires the use of customized material distributing means on the barge or vessel, in contrast to this invention which allows the full use of standard vessels and conventional dockside equipment. Furthermore, the prior art device lacks the capability of the present invention to automatically load a floating vessel from end-to-end and terminate the load-out with the loaded vessel in a loaded state.

Additional features and advantages of the invention will become apparent during the course of the following detailed description.

BRIEF DESCRIPTION OF THE DRAWINGS

FIG. 1 is a partly schematic side elevation of a floating barge being loaded automatically in the fore and aft direction according to the invention.

FIG. 2 is a similar view showing a vessel and coacting dockside material delivery equipment in different relative positions as the vessel load-out progresses.

FIG. 3 is a further view similar to FIGS. 1 and 2 showing the vessel completely loaded and level after automatic termination of the load-out with the vessel and dockside equipment in their final relative positions.

DETAILED DESCRIPTION

Figure 4:
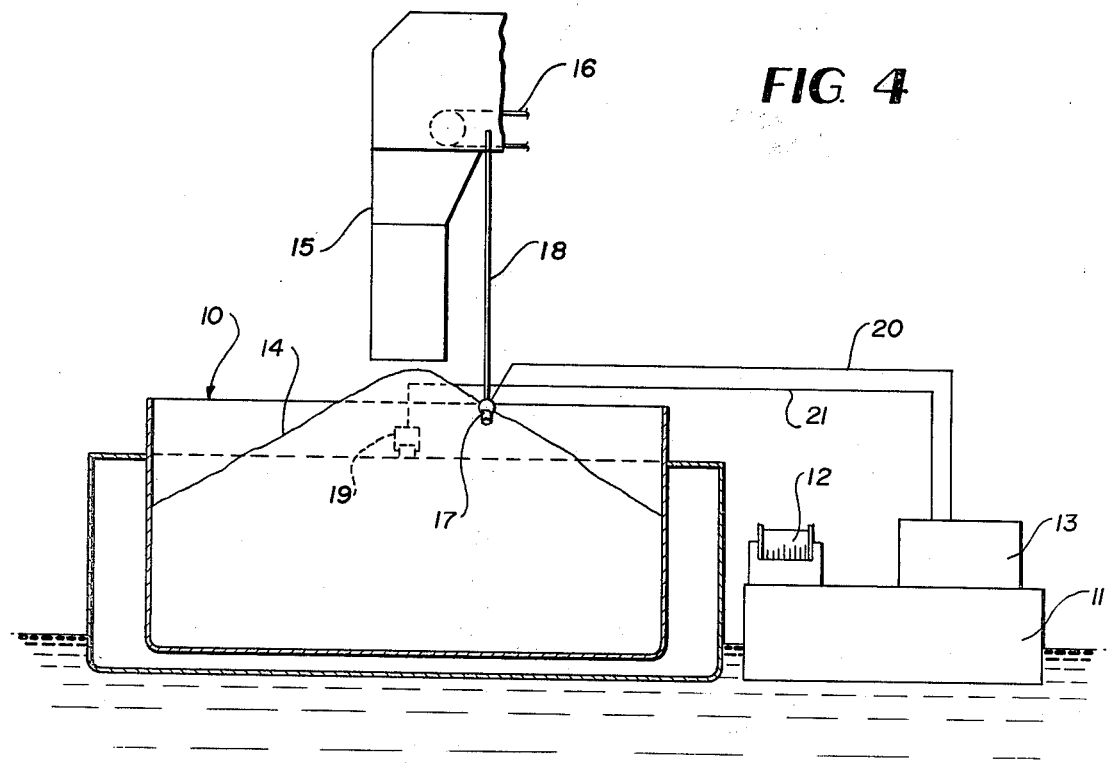
FIG. 4 is a head-on view of the vessel undergoing loading and the coacting dockside equipment corresponding to FIG. 1.

Referring to the drawings in detail wherein like numerals designate like parts, the numeral 10 designates a barge adapted to carry flowable solids in the manner illustrated. The invention is applicable to any type of floating vessel capable of being loaded with flowable material. In FIG. 4, the barge 10 is shown beside a dock 11 upon which is mounted a winch 12 whose cable can be suitably attached to the barge to pull the barge at proper times fore or aft along the dock during the automatic load-out procedure. Other kinds of movement means could be utilized such as a hydraulic cylinder or the like.

A suitable electrical control unit 13, to be further described, is also shown mounted on the dock 11. Equipment on the dock or adjacent shore to load the barge 10 with flowable material 14 is also provided. As illustrated, this equipment may consist of a stationary material delivery chute 15 above the longitudinal center line of the barge and fed with the flowable material by an associated conveyor 16. Other forms of delivery means can be employed such as a crane with a clamshell bucket or a hopper mounted on a tramway. In terms of the invention, the necessary relative movement between the barge and the material delivery means can be obtained either by moving the barge fore or aft relative to the delivery means, or, if preferred, by moving the delivery means relative to the barge or vessel 10 in a fore and aft plane.

The invention additionally comprises a load level sensor 17 in the form of a tilt switch which can be suspended adjustably by a cable 18 from any suitable overhead support. The load level sensor 17 may be of a type manufactured by Ramsey Engineering Company, 1853 West County Rd., C, St. Paul, Minn. 55113, as Model No. 20-30, with Model No. 20-35, Electronic Time Delay Control Panel. The sensor 17 is disclosed in U.S. Pat. No. 3,114,804. Other types of load level sensors could be employed for purposes of the invention including differential pressure devices, rotating paddles or optical sensors.

In a first aspect of the invention, the loading of the barge 10 may be commenced near the stern of the barge with the barge level in the water at dockside and properly positioned relative to the material delivery chute 15. As the material 14, FIG. 1, rises sufficiently from the floor of the vessel, the level sensor 17 which was initially free-hanging and vertical will be tilted and such action will activate the dockside winch 12 or equivalent means to move the vessel 10 sternward in the illustrated embodiment to the next loading position, FIG. 2. In this position, the sensor 17 is again free-hanging and vertical and the winch 12 is deactivated. This operation is repeated until the vessel 10 is automatically loaded from end-to-end up to a desired predetermined level or fullness, as shown in FIG. 3.

In a second major aspect of the invention, a vessel list or slope sensor 19 of the pendulum type is temporarily or permanently mounted on a normally level structural member of the vessel with the pendulum system disposed on a proper axis port-to-starboard so as to sense listing in the fore-to-aft plane or direction. The sensor 19 can be of the type manufactured by Honeywell, 1885 Douglas Drive, N., Minneapolis, Minn. 55422, as Slope Sensor 134847A or an equivalent device. Such a sensor generates an electrical signal proportional to the degree of list of the vessel and a separate and final signal when the vessel is in a level plane after being completely loaded fore and aft. As the loading of the vessel incrementally under control of the load level sensor 17 progresses in the described manner, the primary signal from the list sensor 19 will gradually advance toward the null or level point. This change in the primary signal can be understood in view of the fact that the degree of list of the vessel 10 during load-out gradually diminishes from a maximum in FIG. 1 to level in FIG. 3 when the load-out is completed.

As stated, when the level point is reached, the pendulum-type sensor 19 will produce its separate and final signal indicative of the level condition of the vessel and this final signal will halt the operation of the material delivery equipment at dockside, such as the conveyor 16. In other cases, the final signal from the list sensor 19 may be used to alert personnel to manually interrupt the material delivery equipment.

Since the vessel 10 will normally be level prior to loading, a conventional electrical override system is employed to temporarily bypass the level or null position of the list sensor 19 to enable the automatic load-out procedure to begin. After it has begun in the described manner under control of the load level sensor 17, the operation of the list sensor 19 to monitor the gradual return to level of the vessel will proceed as above-described until the final signal at null or level causes the shutting off of the material delivery means.

Figure 5:
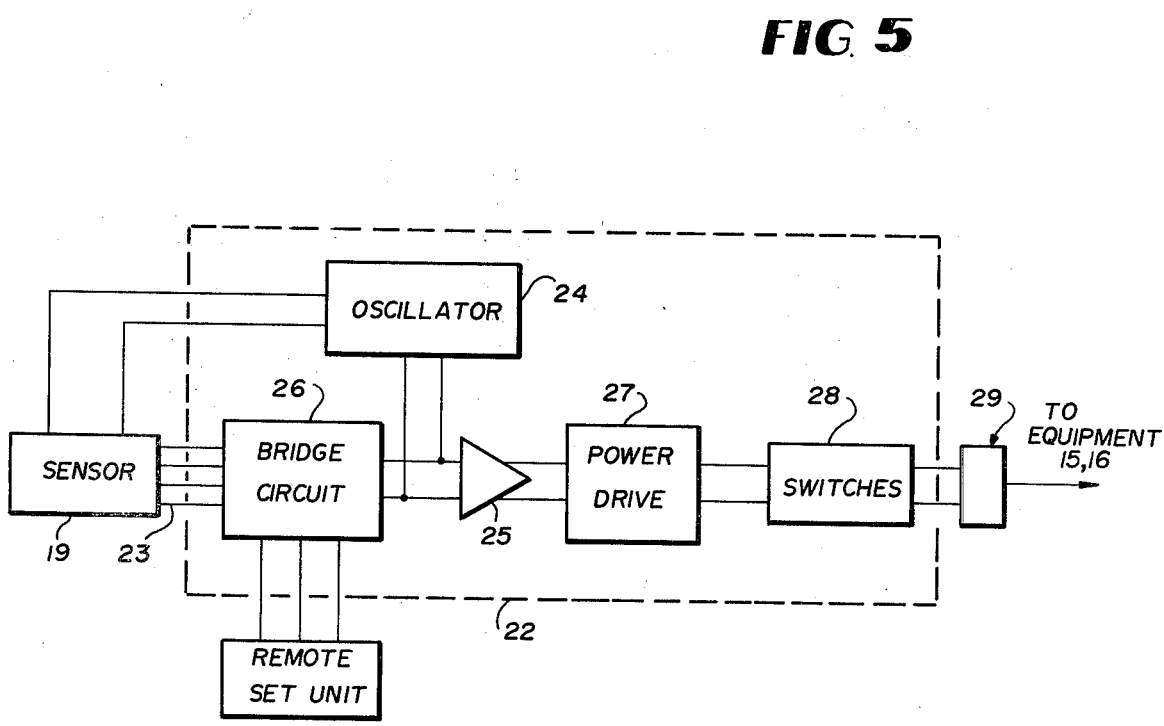
FIG. 5 is a block diagram depicting the activity of the vessel list sensor during the vessel load-out and for terminating the load-out automatically.

The dockside control unit 13 is suitably connected electrically at 20 and 21 with the two coacting sensors 17 and 19. FIG. 5 illustrates an amplifier 22 for the pendulum list or slope sensor 19. The sensor 19 is connected by a multi-conductor cable 23 to the amplifier 22 which is part of the control unit 13 at dockside. The amplifier 22 is also conventional and is manufactured by Honeywell as Model R7232A, Remote Amplifier. Power for the amplifier is obtained from a 12 volt D.C. source, not shown. An oscillator 24 provides excitation to the external list sensor 19, and in addition supplies an input to the amplifier 25, setting the frequency of the pulse width to the operating means of the material delivery equipment. A bridge 26 accepts floating A.C. signals from the sensor 19 and rectifies the signals. A D.C. error signal from bridge 26 is summed with a signal from the oscillator 24 to form the input to amplifier 25. The output of the amplifier 25 operates a power drive 27 which is coupled through switches 28 with the control and operating means of the material delivery equipment indicated generally at 29 in FIG. 5.

Thus, in summation of the operation, the empty vessel in a normally level state is positioned at dockside to be loaded automatically in the fore and aft direction beginning at the stern or at the bow. Under control of the load level sensor 17, either the vessel or the material delivery means are incrementally moved relatively until the vessel is entirely loaded from end-to-end up to a predetermined level of material. During such automatic loading, the pendulum-type list sensor 19 generates a signal in proportion to the degree of listing of the vessel and as the vessel loading progresses the degree of listing gradually diminishes toward a level condition of the vessel when fully loaded, FIG. 3. Simultaneously, the signal produced by the list sensor 19 progressively changes toward the null or level state and when this state is reached, a separate signal produced by the list sensor 19 shuts off the material delivery means automatically. The electrical connections to and within the control unit 13 are all conventional and need not be further described.

It is to be understood that the form of the invention herewith shown and described is to be taken as a preferred example of the same, and that various changes in the shape, size and arrangement of parts may be resorted to, without departing from the spirit of the invention or scope of the subjoined claims.

I claim:

1. A method of loading a floating vessel with flowable material comprising delivering flowable material into the vessel near one end of the vessel and sensing the level of the material in the vessel to thereby activate a means to cause a relative movement between the vessel and said material delivery means in the end-to-end direction of the vessel, repeating the delivery of the flowable material and the sensing of the level of the material at incremental locations along the vessel until the vessel is loaded from end-to-end to a desired level of the flowable material, simultaneously during the progressive loading of the vessel from end-to-end sensing the degree of list of the vessel in an end-to-end plane caused by said loading and thereby producing an electrical signal in proportion to the degree of list of the vessel and changing the magnitude of the electrical signal in accordance with diminishing list of the vessel as the loading of the vessel progresses to completion where the vessel is level, and then producing a separate and final electrical signal indicative of the level state of the fully loaded vessel and utilizing such final signal to terminate the delivery of flowable material into the vessel.

2. A method of loading a floating vessel in a fore-to-aft plane with flowable material comprising delivering flowable material from an overhead delivery means into the vessel beginning near one end of the vessel, sensing the level of the flowable material in the vessel and moving the vessel in one direction in said fore-to-aft plane relative to said delivery means and repeating the procedure until the vessel is completely loaded in the fore-to-aft plane to a desired level with the flowable material, continually sensing the degree of list of the vessel in the fore-to-aft plane during the loading procedure and producing an electrical signal proportional to the degree of list at any point in the loading procedure, and then sensing a level state of the vessel after it is fully loaded in the fore-to-aft plane and producing a final electrical signal indicative of the level state of the vessel and utilizing the final signal to terminate the operation of said delivery means.

3. A method of loading a floating vessel with flowable material comprising delivering flowable material into the vessel at one location on the vessel, sensing the level of the flowable material near said one location and moving the vessel relative to means delivering the flowable material in response to said sensing, again delivering flowable material into the vessel at a second location therein and sensing the level of said material at the second location and again moving the vessel in response to said sensing, repeating the procedure until the vessel is fully loaded with said flowable material, sensing the degree of listing of the vessel along the axis on which the vessel is being loaded during all of the above procedure and producing an electrical signal proportional to the degree of listing at all points along the axis of loading of the vessel, and then sensing a level state of the vessel after it is fully loaded with said material and producing an electrical signal responsive to said last-named sensing to terminate the delivery of flowable material into the vessel.

4. Apparatus for automatically loading a floating vessel with flowable material comprising a flowable material delivery means positioned to direct flowable material into the vessel, a sensor positioned relative to the vessel to sense the level of flowable material therein, power means activated by the sensor to produce relative movement between said material delivery means and said vessel, and a vessel list sensor on the vessel to sense listing of the vessel along the axis of loading of the vessel during the loading thereof and producing a signal which is at all times proportional to the degree of list of the vessel including a final signal indicative of a level state of the vessel when the vessel is fully loaded to thereby terminate the operation of said delivery means.

5. Apparatus for automatically loading a floating vessel as defined in claim 4, and said power means being separated from the vessel and having a connection with the vessel to move the vessel relative to said delivery means along an axis of loading.

6. Apparatus for automatically loading a floating vessel as defined in claim 5, and said first-named sensor being a tilt switch suspended above the floating vessel and being electrically connected with said power means.

7. Apparatus for automatically loading a floating vessel as defined in claim 6, and said power means comprising a dockside winch.

8. Apparatus for automatically loading a floating vessel as defined in claim 4, and said list sensor comprising a pendulum sensor having an electrical connection with said delivery means.

9. Apparatus for automatically loading a floating vessel as defined in claim 6, and said list sensor comprising a pendulum sensor having an electrical connection with said delivery means.

10. Apparatus for automatically loading a floating vessel as defined in claim 9, and the pendulum axis of the list sensor being in the port-to-starboard direction on the floating vessel whereby the list sensor responds to listing of the vessel in the fore and aft direction during loading of the vessel in the fore and aft direction.

* * * * *